United States Patent [19]

Cumming et al.

[11] 4,181,833

[45] Jan. 1, 1980

[54] CLOSURE ELECTRICAL CONTACT ASSEMBLY

[75] Inventors: Richard J. Cumming, Warren; Warren R. Stephenson, Sterling Heights, both of Mich.

[73] Assignee: General Motors Corporation, Detroit, Mich.

[21] Appl. No.: 913,456

[22] Filed: Jun. 7, 1978

[51] Int. Cl.² .............................................. H01H 3/16
[52] U.S. Cl. ............................. 200/61.62; 200/61.78; 200/61.81; 200/250; 200/287
[58] Field of Search ................. 200/61.62, 61.7–61.75, 200/238, 239, 241, 245–247, 250, 284, 287, 61.76, 61.78, 61.81

[56] References Cited

U.S. PATENT DOCUMENTS

| 764,135 | 7/1904 | Lau | 200/52 R X |
|---|---|---|---|
| 2,646,477 | 7/1953 | Herterick | 200/51.13 |
| 3,643,050 | 2/1972 | Pfeifer | 200/287 X |
| 3,692,992 | 9/1972 | Bain et al. | 200/61.62 X |
| 3,713,670 | 1/1973 | Reynolds | 200/61.62 X |
| 3,919,509 | 11/1975 | Schnitzius | 200/61.62 |
| 3,982,119 | 9/1976 | Aluzzo et al. | 362/232 |
| 4,146,762 | 3/1979 | Peck et al. | 200/61.62 |

OTHER PUBLICATIONS

Oldsmobile Service Manual, 1962, pp. 15-31.

Primary Examiner—James R. Scott
Attorney, Agent, or Firm—F. J. Fodale

[57] ABSTRACT

The rear pillars of an automobile body carry power and ground contact assemblies which engage contact plates of the electric rear window defogger when the lift gate is closed. The power and ground contact assemblies each consist of a plastic housing and a flat conductor strip which is stamped and bent to shape. The housings for both assemblies are identical. Both conductor strips comprise two elongated legs providing a depressible contact. The conductor strip for the power contact assembly has a terminal portion for connection to a power lead. The conductor strip for the ground contact assembly has a ground strap portion for connection to the pillar.

3 Claims, 7 Drawing Figures

CLOSURE ELECTRICAL CONTACT ASSEMBLY

BACKGROUND OF THE INVENTION

This invention relates generally to electrical contact assemblies and more particularly to electrical contact assemblies for use with a movable closure panel such as an automobile lift gate.

A popular accessory in today's automobiles is an electric rear window defogger comprising an electric grid laminated on the inside surface of the rear window. Certain types of automobile bodies have rear lift gates with fixed windows. In the past the power and ground connections to the electric rear window defogger on these windows were made by a pair of insulated wires which extended from the automobile body and were securely attached to bus bars or contact plates on the inside of the window.

While this method works very well electrically, the insulated wires are unsightly, particularly when the lift gate is in the closed position where the insulated wires are slack and hang down into the field of view.

The object of this invention is to provide an aesthetically improved method of making the power and ground connections to contact plates on a lift gate window or the like.

Another object of this invention is to provide inconspicuous, projecting contacts which make spring biased power and ground connections to an electric rear window defogger when the lift gate is closed.

Yet another object of this invention is to provide contact assemblies which engage only when the lift gate is in the closed position thus assuring deactivation of the electric rear window defogger when the lift gate is in the open position.

Yet still another object of the invention is to provide power and ground contact assemblies consisting of two parts, one of which is a common design for the power and ground versions.

Yet still another object of this invention is to provide contact assemblies having movable contacts which are depressed substantially linearly to avoid the scrubbing action of transverse motion during engagement.

BRIEF DESCRIPTION OF THE DRAWINGS

Other objects and features of the invention will become apparent to those skilled in the art as the disclosure is made in the following detailed description of preferred embodiments of the invention as illustrated in the accompanying sheets of drawing in which.

DESCRIPTION OF THE PREFERRED EMBODIMENT

Figure 1:
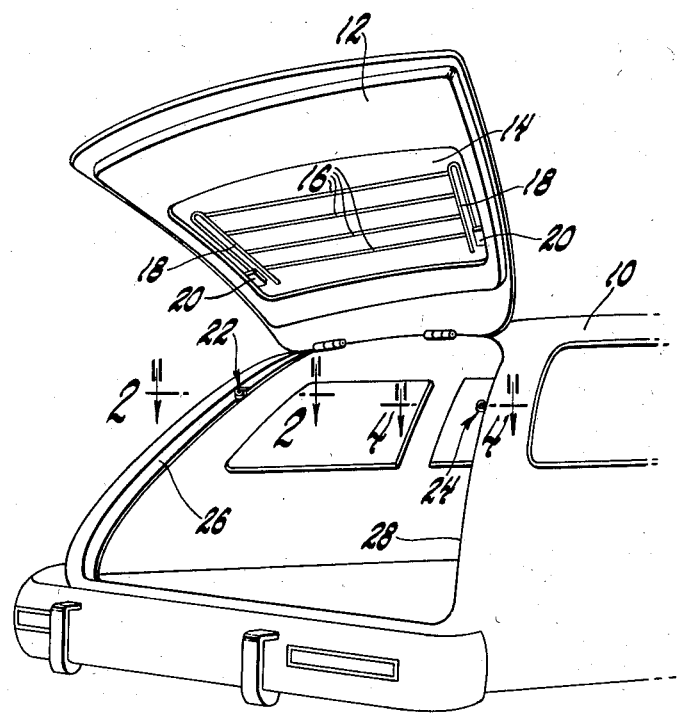
FIG. 1 is a perspective view of the rear portion of an automobile having a rear lift gate equipped with an electric rear window defogger.

Referring now to the drawing and more particularly to FIG. 1, the automobile 10 has a rear lift gate 12 which is shown in the open position. The lift gate 12 has a fixed window 14 which is equipped with an electric window defogger comprising parallel resistance heater wires 16 spanning bus bar wires 18. Each of the bus bar wires 18 is electrically connected to an associated contact plate 20 laminated on the inside surface of the window. When the lift gate 12 is in the closed position (shown in phantom in FIGS. 2 and 4) the contact plates 20 are engaged by inconspicuous protruding portions of the power and ground contact assemblies 22 and 24 associated with the body pillars 26 and 28 respectively.

Figure 2:
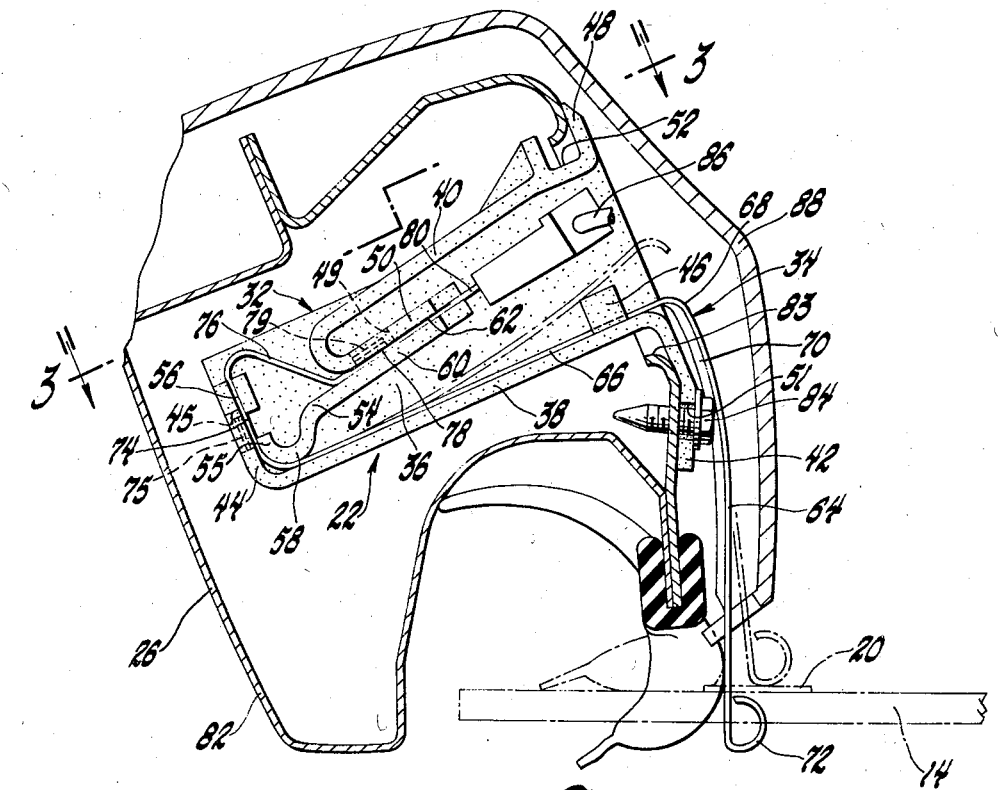
FIG. 2 is a section through the left hand rear pillar of the automobile body taken substantially along the line 2—2 of FIG. 1 looking in the direction of the arrows.
Figure 3:
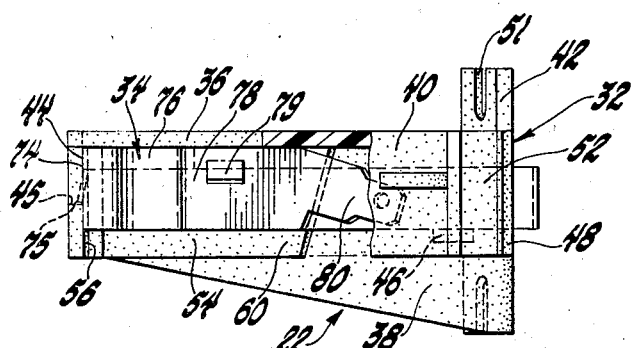
FIG. 3 is a view taken substantially along the line 3—3 of FIG. 3 looking in the direction of the arrows and showing the power contact assembly.
Figure 6:
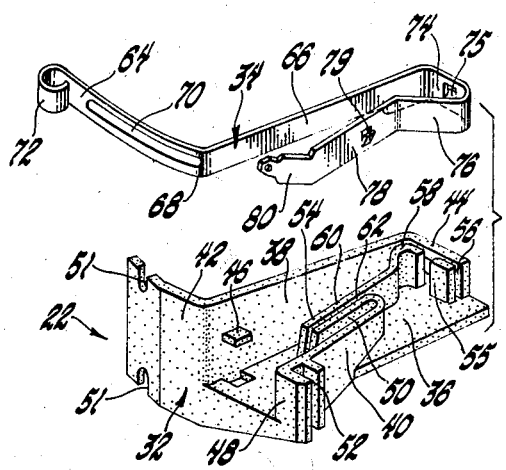
FIG. 6 is an exploded perspective view of the power contact assembly shown in FIGS. 2 and 3.

The power contact assembly 22 is shown in FIGS. 2, 3 and 6. It consists of two parts-a plastic housing 32 of dielectric material and a stamped and bent flat conductor strip 34 of beryllium copper or other suitable electrically conductive material.

The housing 32 has a generally rectangular base 36 and upright side walls 38 and 40 connected to the opposite longitudinal edges of the base. The side wall 38 is trapezoidal and decreases in height from the front edge of the base 36 where it is connected to a transverse mounting flange 42 to the rear edge of the base where it is connected to a transverse rear wall 44. The rear wall 44 has a lower slot 45 to provide a latch edge. The side wall 38 has a lateral tab 46 at the higher front end. The lateral tab 46 is part way up from the base 36 and extends toward the wall 40.

The wall 40 is connected to a second transverse flange 48 at the front edge of the base and extends part way back to a median location where the wall 40 reverses direction to provide an internal wall 50. The internal wall 50 has a lower slot 49 to provide a latch edge. The mounting flanges 42 and 48 extend laterally away from each other. The flange 42 has a pair of screw slots 51 and the flange 48 has a mounting groove 52.

A second internal wall 54 is J-shaped in plan form. The rearward portion 55 forms a narrow mounting slot 56 in conjunction with the rear wall 44 and provides a rounded fulcrum 58 spaced from the rear portion of the side wall 38 by a small gap. The forward portion 60 of the internal wall 54 forms a second mounting slot 62 in conjunction with the internal wall 50.

The conductor strip 34 has angularly related elongated legs 64 and 66 connected at a bend 68. The leg 64 has a longitudinal stiffening rib 70 and a rounded nose 72 formed by curling the free end of the leg 64. The rearward portion of the leg 66 is wider and contiguous with a transverse tab 74 which has a tang 75. The tab 74 is securely mounted in the narrow slot 56 and secured therein by the tang 75. The opposite end of the tab 74 is contiguous with a converging portion 76 which in turn is contiguous with a diverging portion 78 having a tang 79. The diverging portion 78 is securely mounted in the slot 62 and retained therein by the tang 79. The diverging portion 78 projects forwardly of the slot 62 and has an upswept integral terminal 80 at its free end.

When the conductor strip 34 is securely mounted in the housing 32, the rounded nose 72 may be depressed in a substantially linear fashion from the solid line position to the phantom position shown in FIG. 2. The substantially linear movement is accommodated by the relative stiffness of the leg 64 in comparison to the relatively resilient leg 66 which flexes away from the wall 38 about the rounded fulcrum 58. The transverse tab 46 serves as a retainer to hold the flexed leg 66 in the proper position relative to the housing 32.

The power contact assembly 22 is mounted in the two piece sheet metal column structure 82 of the left hand pillar 26 via an access hole 83. The housing 32 is inserted in the access hole 83 and then slid tranversely to engage one edge of the hole 83 in the mounting groove 52 of the flange 48. The flange 42 is then secured to the column structure 82 by two sheet metal screws 84. A power lead 86 is connected to the terminal 80 and a pillar covering 88 is then placed over the sheet metal column 82 hiding the power contact assembly 22 except for the inconspicuous protruding nose 72. The power contact assembly 22 is mounted, so that the straignt end portion of the leg 64 is substantially perpendicular to the contact plate 20 when the lift gage 12 is closed. This placement and the substantially linear motion capability of the nose 72 avoids scrubbing between the nose 72 and the contact plate 20 as the lift gate 12 is closed.

The ground contact assembly 24 is mounted in the right hand pillar in an identical manner except that it is inverted or upside down with respect to the power contact assembly 22.

The housing 132 for ground contact assembly 24 is identical to the housing 32 and like portions are identified by adding 100 to the identifying numerals of the former. The corresponding portions of the right hand pillar are identified in the same manner.

Figure 5:
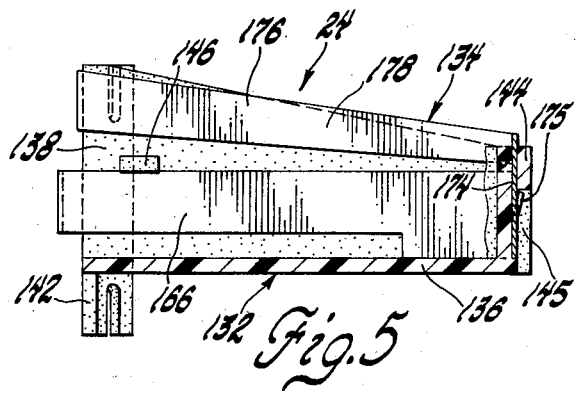
FIG. 5 is a section taken along the line 5—5 of FIG. 4 looking in the direction of the arrows and showing the ground contact assembly.
Figure 4:
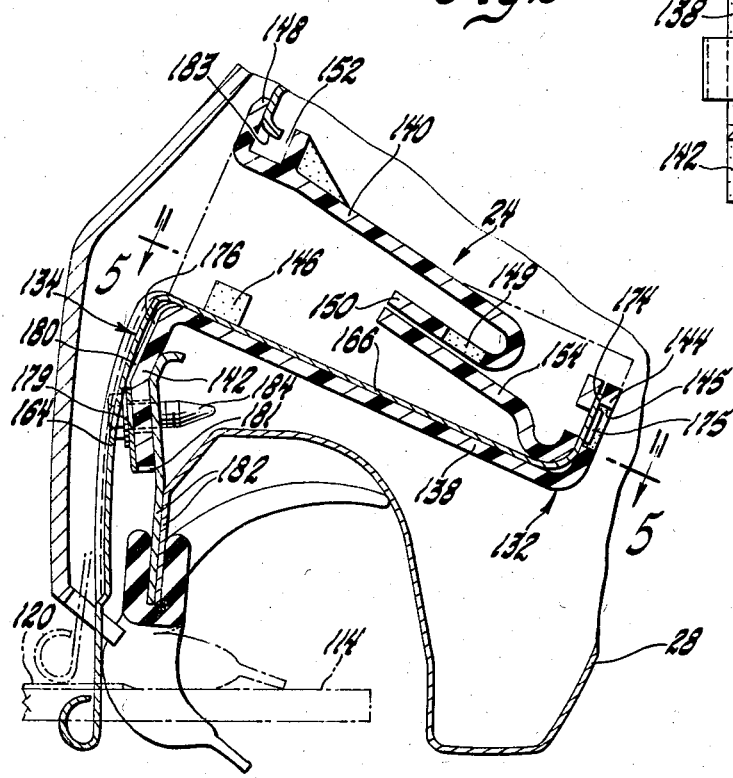
FIG. 4 is a section through the right hand rear pillar of the automobile body taken substantially along the line 4—4 of FIG. 1 looking in the direction of the arrows.
Figure 7:
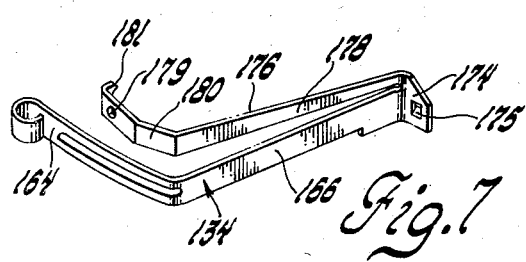
FIG. 7 is a perspective view of the conductor strip for the ground contact assembly shown in FIGS. 4 and 5.

The conductor strip 134 for the ground connector assembly 24 is shown in FIGS. 4, 5 and 7. It is similar to the conductor strip 34 and has an identical depressible portion comprising the elongated legs 164 and 166. The modification begins with the transverse tab portion 174 at the free end of the leg 166 which is wider than before to integrally connect with a ground strap portion 176. The ground strap portion 176 comprises an elongated portion 178 which is spaced from and parallels the leg 166 and a transverse portion 180 which conforms to the shape of the housing mounting flange 142. The transverse portion 180 has a hole 179 adjacent an end provided with teeth 181. When the ground connector assembly is secured to the sheet metal column structure 182, one of the sheet metal screws 184 extends through the hole 179 also securing the ground strap 176 against the flange 142 and causing the teeth 181 to bite into the sheet metal column structure 182. The sheet metal screw and the teeth 181 provide the ground path to the sheet metal column structure 182.

We wish it to be understood that we do not desire to be limited to the exact details of construction shown and described, for obvious modifications will occur to a person skilled in the art.

What is claimed is:

1. A contact assembly for making an electrical connection to a contact plate carried by a movable closure panel when the closure panel is in the closed position comprising:

a housing of dielectric material and a generally flat conductor strip stamped and bent to shape, said housing having a generally rectangular base having longitudinal edges, a front edge and a rear edge, a first upright side wall connected to a one longitudinal edge of the base, a second upright side wall connected to the opposite longitudinal edge of the base, a transverse tab which is part way up on the first side wall adjacent its front edge and which extends toward said second side wall, flange means at the front edge of each said side walls extending laterally outwardly away from each other, an upright lateral wall adjacent the rear edge of the base, an upright internal wall forming a narrow mounting slot in conjunction with the lateral wall and a fulcrum spaced from a rearward portion of the first side wall by a small gap, said conductor strip having first and second elongated legs connected at a bend, said first leg having a longitudinal stiffening rib and a rounded nose at the end thereof remote from the bend, said second leg having a transverse tab at the end thereof remote from said bend which is securely mounted in the narrow slot formed by the lateral wall and the internal wall of the housing, said conductor strip having a disengaged position where said first leg projects laterally beyond the flange means at the front edge of said first side wall and said second leg abuts the first side wall and passes between the lateral tab and the base, and said conductor strip being movable to a depressed position where said first leg is retracted substantially linearly by said second leg being flexed about the fulcrum away from the first side wall.

2. A contact assembly for making an electrical connection to a contact plate carried by a movable closure panel when the closure panel is in the closed position comprising, a housing of dielectric material and a generally flat conductor strip stamped and bent to shape, said housing having a generally rectangular base having longitudinal edges, a front edge and a rear edge, a first upright side wall connected to one longitudinal edge of the base, a second upright side wall connected to the opposite longitudinal edge of the base, a transverse tab which is part way up on the first side wall adjacent its front edge and which extends toward said second side wall, a flange means at the front edge of each said side walls extending laterally outwardly away from each other, an upright lateral wall adjacent the rear edge of the base, a first upright internal wall forming a narrow rounded fulcrum spaced from a rearward portion of the first side wall by a small gap, a second upright internal wall forming a second narrow mounting slot in conjunction with the first upright internal wall, said conductor strip having first and second elongated legs connected at a bend, said first leg having a longitudinal stiffening rib and a rounded nose at the end thereof remote from said bend, said second leg having a transverse tab at the end thereof remote from said bend which is securely mounted in the narrow slot formed by the lateral wall and the internal wall of the housing, a terminal portion contiguous with the transverse tab at an end remote from said second leg, said terminal portion having a portion which is securely mounted in the second narrow slot formed by the first and second internal walls, said conductor strip having a disengaged position where said first leg projects laterally beyond the flange means at the front edge of said first side wall and said second leg abuts the first side wall and passes between the tab and the base, and said conductor strip being movable to a depressed position where said first leg is retracted substantially linearly by said second leg being flexed about the fulcrum away from the first side wall.

3. A contact assembly for making an electrical connection to a contact plate carried by a movable closure panel when the closure panel is in the closed position comprising, a housing of dielectric material and a generally flat conductor strip stamped and bent to shape, said housing having a generally rectangular base having longitudinal edges, a front edge and a rear edge, a first upright side wall connected to one longitudinal edge of the base, a second upright side wall connected to the opposite longitudinal edge of the base, a transverse tab which is part way up on the first side wall adjacent its front edge and which tab extends toward said second side wall, flange means at the front edge of each said side walls extending laterally outwardly away from each other, an upright lateral wall adjacent the rear edge of the base, an upright internal wall forming a narrow mounting slot in conjunction with the lateral wall and a rounded fulcrum spaced from a rearward portion of the first side wall by a small gap, said generally flat conductor strip having a first and second elongated legs connected at a bend, said first leg having a longitudinal stiffening rib and a rounded nose at the end thereof remote from the bend, said second leg having a transverse tab at the end thereof remote from said bend which is securely mounted in the narrow slot formed by the lateral wall and the internal wall of the housing, a ground strap portion contiguous with the transverse tab at an end adjacent said second leg, said ground strap portion having an elongated portion which is spaced from and parallels said second leg and a transverse portion which conforms to the flange means at the front edge of said first side wall, said conductor strip having a disengaged position where said first leg projects laterally beyond the flange means at the front edge of said first side wall and said second leg abuts the first side wall and passes between the tab and the base, and said conductor strip being movable to a depressed position where said first leg is retracted substantially linearly by said second leg being flexed about the fulcrum away from the first side wall.

* * * * *

UNITED STATES PATENT AND TRADEMARK OFFICE
CERTIFICATE OF CORRECTION

PATENT NO. : 4,181,833
DATED : January 1, 1980
INVENTOR(S) : Richard J. Cumming & Warren R. Stephenson It is certified that error appears in the above-identified patent and that said Letters Patent are hereby corrected as shown below:

Col. 3, line 21, "straignt" should read -- straight --;
line 23, "gage" should read -- gate --.

Col. 4, claim 2, line 55, after "narrow" insert -- mounting slot in conjunction with the lateral wall and a --.

Col. 6, claim 3, line 10, after "having" delete "a".

Signed and Sealed this

Third Day of June 1980

[SEAL]

Attest:

SIDNEY A. DIAMOND

Attesting Officer        Commissioner of Patents and Trademarks